US012772059B2

(12) United States Patent
Bruno et al.

(10) Patent No.: US 12,772,059 B2
(45) Date of Patent: Oct. 20, 2026

(54) SYSTEM AND METHOD FOR IMPLEMENTING NETWORK DEVICE MANAGEMENT IN AN UNDERSECURED ENVIRONMENT

(71) Applicants: AT&T Global Network Services France SAS, Courbevoie (FR); AT&T Global Network Services Switzerland GmbH, Zurich (CH)

(72) Inventors: Aurelien Bruno, Colomars (FR); Bertrand Buclin, Jouxtens-Mezery (CH)

(73) Assignees: AT&T Global Network Services France SAS, Courbevoie (FR); AT&T Global Network Services Switzerland GmbH, Zurich (CH)

( * ) Notice: Subject to any disclaimer, the term of this patent is extended or adjusted under 35 U.S.C. 154(b) by 0 days.

(21) Appl. No.: 19/091,362

(22) Filed: Mar. 26, 2025

(65) Prior Publication Data

US 2026/0304124 A1 Oct. 1, 2026

(51) Int. Cl.
*H04W 12/084* (2021.01)

(52) U.S. Cl.
CPC ................................ *H04W 12/084* (2021.01)

(58) Field of Classification Search
CPC ............................ H04W 12/06; H04W 12/084
USPC .......................................................... 726/2, 4
See application file for complete search history.

(56) References Cited

U.S. PATENT DOCUMENTS

2003/0065919 A1 * 4/2003 Albert ..................... G06F 21/31 713/168
2020/0322145 A1 * 10/2020 Sheth .................... H04L 9/3247
2024/0380593 A1 * 11/2024 Bowman ............. H04L 63/0823
2025/0225246 A1 * 7/2025 Ben-Noon ............ G06F 16/955
2025/0294024 A1 * 9/2025 Panasyuk ............ H04L 63/0807
2026/0046305 A1 * 2/2026 Kniffin ................ H04L 63/1433

OTHER PUBLICATIONS

NPL Search Terms (Year: 2026).*
"An Analysis of TACACS+ Protocol Security", Openwall, May 30, 2000, 4.
"TACACS", Wikipedia The Free Encyclopedia, 4.
(Continued)

*Primary Examiner* — Syed A Zaidi
(74) *Attorney, Agent, or Firm* — Guntin & Gust, PLC; Robert Gingher

(57) ABSTRACT

Aspects of the subject disclosure may include, for example, a device, including: a processing system including a processor; and a memory that stores executable instructions that, when executed by the processing system, facilitate performance of operations of: authenticating user equipment over a network interface; communicating with a vault hosted in a secure enclave to dynamically generate a temporary authorization token; sending the temporary authorization token to the user equipment; receiving the temporary authorization token from a network device via a TACACS+ protocol interface for authentication and command authorization; and verifying the temporary authorization token against credentials stored in the vault, thereby implementing a Zero-Trust security model for network device management in an unsecured environment. Other embodiments are disclosed.

20 Claims, 8 Drawing Sheets

(56) References Cited

OTHER PUBLICATIONS

Andrea, Harris, "Cisco Networking Cisco ASA Certifications Training General Cisco Routers Cisco Switches You are here: Home / Cisco ASA Firewall Configuration / Configuring AAA Authentication-Authorization-Accounting on Cisco ASA Firewall (TACACS+, RADIUS) Configuring", Networks Training, 9.

* cited by examiner

100

230

600

SYSTEM AND METHOD FOR IMPLEMENTING NETWORK DEVICE MANAGEMENT IN AN UNDERSECURED ENVIRONMENT

FIELD OF THE DISCLOSURE

The subject disclosure relates to a system and method for implementing network device management in an undersecured environment.

BACKGROUND

Terminal access controller access control system (TACACS) refers to a family of related protocols for handling remote authentication and related services for network access control and management of network devices, where access is granted from a centralized server. The original TACACS protocol, which dates back to 1984, was used for communicating with an authentication server, common in older UNIX networks. TACACS Plus (TACACS+) is a protocol released as an open standard beginning in 1993. Although derived from TACACS, TACACS+ is a separate protocol that handles authentication, authorization, and accounting (AAA) services. TACACS+ has largely replaced its predecessors.

OAuth and OpenID Connect (OIDC) are protocols designed to facilitate secure authorization and authentication over the Internet. OAuth is an open standard for access delegation, commonly used to grant websites or applications limited access to a user's information without exposing passwords. OAuth allows users to authorize third-party applications to access their data stored with another service provider, such as a social media platform, by using tokens instead of credentials. OpenID Connect builds on top of OAuth 2.0 to add an identity layer, enabling clients to verify the identity of the end-user based on the authentication performed by an authorization server. This protocol provides a simple and standardized way to authenticate users and obtain basic profile information. In this protocol, applications follow the same process of authorization and authentication to add an extra layer of clustering.

Secure enclaves, on the other hand, refer to a technology that provides a protected area within a processor where sensitive data can be processed in isolation from the rest of the system. This ensures that even if the main operating system is compromised, the data within the secure enclave remains protected. Secure enclaves are used to enhance security by safeguarding cryptographic keys, personal information, and other sensitive data, making them inaccessible to unauthorized applications or users. This technology is particularly valuable in environments where data security is paramount, as it provides a robust layer of protection against various types of cyber threats.

A Zero-Trust security model is a security framework that fundamentally shifts the traditional approach to network security. Instead of assuming that everything within an organization's network is inherently trustworthy, the model operates on the principle of "never trust, always verify." This means that every user, application and device, whether inside or outside the network perimeter, must undergo strict verification before accessing resources.

The model emphasizes granting users, applications and devices only the minimum level of access necessary to perform their functions, thereby reducing the risk of unauthorized access to sensitive data and device capabilities (i.e., read, update, privilege escalation). It involves dividing the network into smaller, isolated segments, a process known as micro-segmentation, to limit the lateral movement of threats within the network. Continuous monitoring and validation of user, application and device behavior are essential components, allowing for real-time detection and response to anomalies. This model also emphasizes the provisioning of functions designed to manage high volumes of transactions between users, application and network elements, thereby facilitating large-scale automation. Furthermore, the model ensures user-friendly access capabilities via a native application interface for routine user interaction.

BRIEF DESCRIPTION OF THE DRAWINGS

Reference will now be made to the accompanying drawings, which are not necessarily drawn to scale, and wherein.

DETAILED DESCRIPTION

Figure 1:
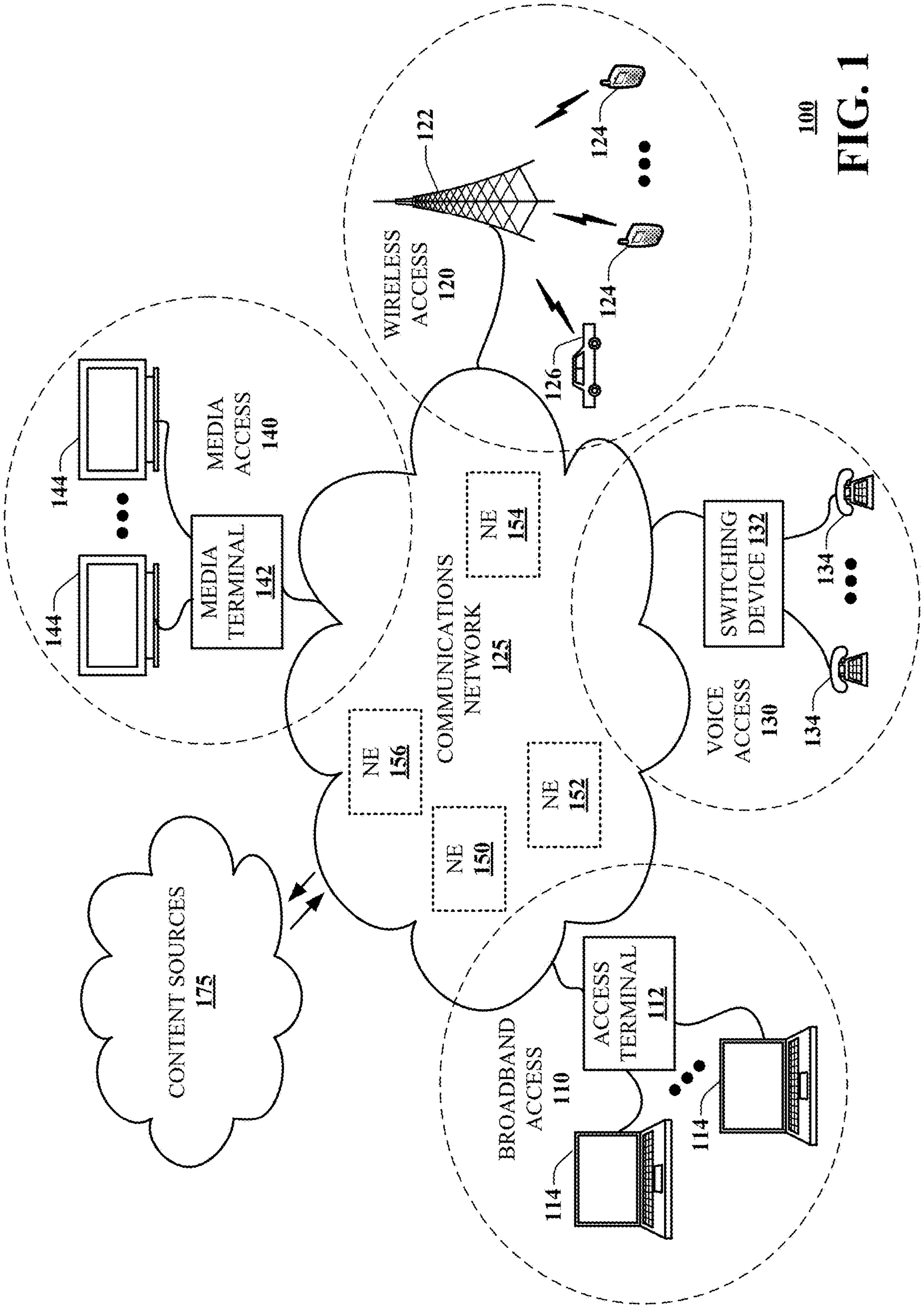
FIG. 1 is a block diagram illustrating an exemplary, non-limiting embodiment of a communications network in accordance with various aspects described herein.

The subject disclosure describes, among other things, illustrative embodiments for a system and method for implementing network device management in an unsecured environment. Other embodiments are described in the subject disclosure.

One or more aspects of the subject disclosure include a device, including: a processing system including a processor; and a memory that stores executable instructions that, when executed by the processing system, facilitate performance of operations of: authenticating user equipment over a network interface; communicating with a vault hosted in a secure enclave to dynamically generate a temporary authorization token; sending the temporary authorization token to the user equipment; receiving the temporary authorization token from a network device via a TACACS+ protocol interface for authentication and command authorization; and verifying the temporary authorization token against credentials stored in the vault, thereby implementing a Zero-Trust security model for network device management in an unsecured environment.

One or more aspects of the subject disclosure include a non-transitory machine-readable medium, storing executable instructions that, when executed by a processing system including a processor, facilitate performance of operations, including: authenticating user equipment over a network interface; communicating with a secure enclave-hosted vault to dynamically generate a temporary authorization token; sending the temporary authorization token to the user equipment; receiving an authentication verification request from a network device via a TACACS protocol interface for authentication and command authorization, wherein the authentication verification request includes the temporary authorization token; verifying the temporary authorization token against securely stored credentials; and providing an authentication verification response to the network device via the TACACS protocol interface, thereby implementing a Zero-Trust security model for network device management in an unsecured environment.

One or more aspects of the subject disclosure include a method of: authenticating, by a processing system including a processor, user equipment over a network interface; coordinating, by the processing system, with a secure enclave-hosted vault to dynamically generate a temporary authorization token; sending, by the processing system, the temporary authorization token to the user equipment; receiving, by the processing system, an authentication verification request from a network device via a TACACS protocol interface for authentication and command authorization, wherein the authentication verification request includes the temporary authorization token; verifying, by the processing system, the temporary authorization token against securely stored credentials; and providing, by the processing system, an authentication verification response to the network device via the TACACS protocol interface, thereby implementing a Zero-Trust security model for network device management in an unsecured environment.

Referring now to FIG. 1, a block diagram is shown illustrating an example, non-limiting embodiment of a system 100 in accordance with various aspects described herein. For example, system 100 can facilitate in whole or in part authenticating user equipment; dynamically generating temporary authorization tokens; and verifying the temporary authorization token against credentials stored in a vault. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
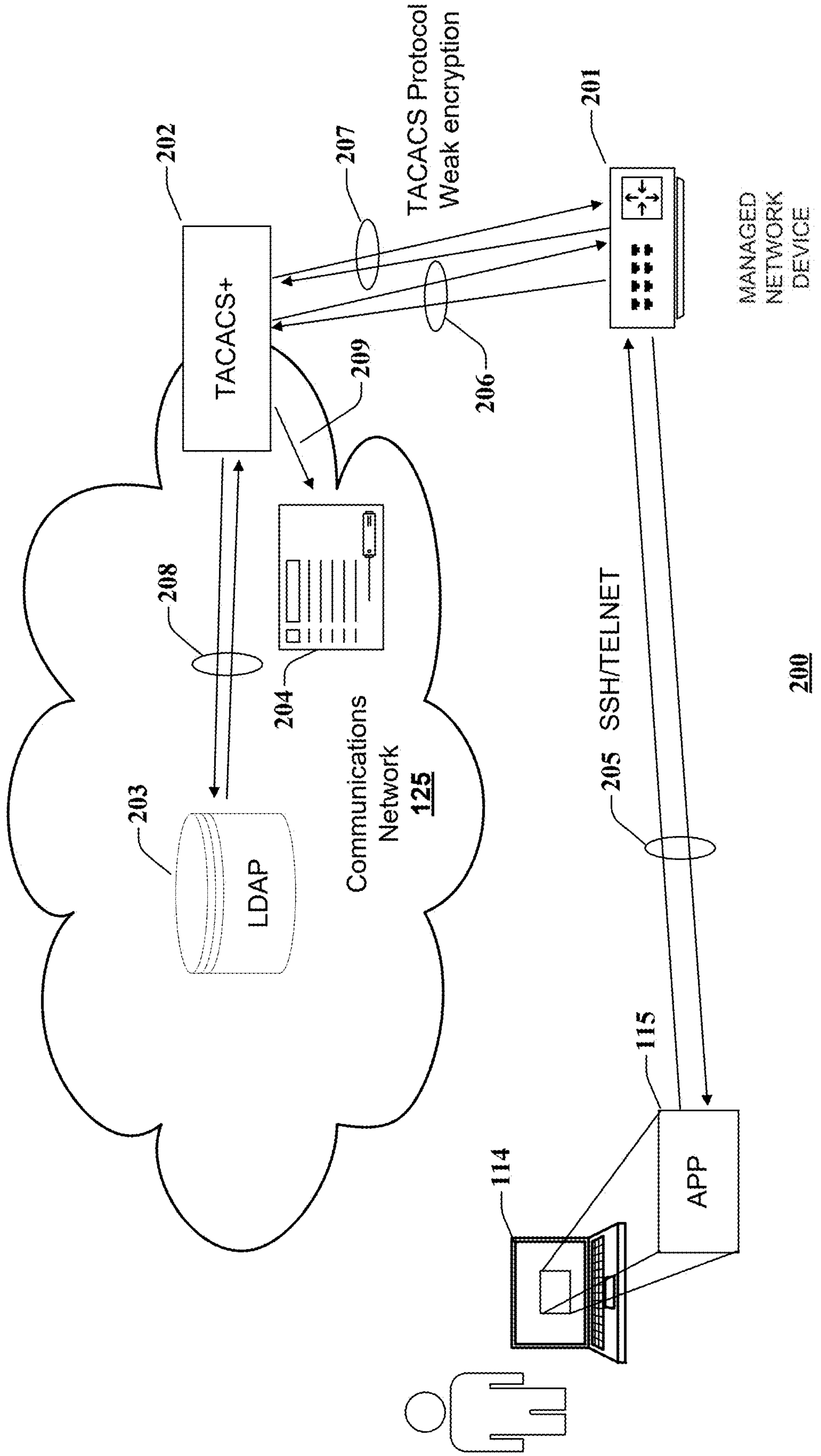
FIG. 2A is a block diagram illustrating an example, non-limiting embodiment of a TACACS+ system operation within the communication network of FIG. 1 in accordance with various aspects described herein.

FIG. 2A is a block diagram illustrating an example, non-limiting embodiment of a TACACS+ system operation with reference to the communication network of FIG. 1 in accordance with various aspects described herein. As shown in FIG. 2A, system 200 comprises a managed network device 201 (such as a router, a switch, a server) and devices within a secure communications network 125, including a TACACS+ server 202, a (LDAP 203) and a logging server 204. The managed network device 201 serves as an endpoint to be managed by an administrative user operating a computer 114, aided by an APP 115 to perform network management including, but not limited to, configuration, audit and troubleshooting tasks. This managed network device 201 can be any network element that requires secure access and management, such as routers 100, switches 101, or firewalls 102, server 103, access point 104, and Customer Premises Equipment (CPE 105). The managed network device 201 is configured to accept connections from the APP 115 and relies on the TACACS+ server 202 for authentication and authorization processes. Managed network device 201 is equipped with interfaces to connect to the communications network 125, allowing the reception and execution of commands from authorized users. The managed network device 201 plays an important role in the network, hence only authenticated and authorized users can perform operations, thereby maintaining the integrity and security of the network.

The TACACS+ server 202 plays a significant role in the authentication and authorization process within the system. This server functions as a centralized hub that manages user credentials and access policies. When the computer 114 or APP 115 sends an authentication request comprising a username and a password, the TACACS+ server 202 verifies the provided credentials through the TACACS+ server 202 and checks the associated permissions. The server communicates with the LDAP 203 server to retrieve user information and validate credentials. The TACACS+ server 202 is responsible for enforcing security policies and ensuring that only authorized users can access the managed network device 201. The TACACS+ server 202 provides a robust mechanism for managing user access and maintaining a secure network environment, however the username and password are credentials that may be provided across an unsecured communication path between APP 115 and managed network device 201, as well as between managed network device 201 and the TACACS+ server 202. Hence, there is a potential for the username and password combination to become compromised.

The lightweight directory access protocol server (LDAP 203) functions as a directory service that stores user credentials and profile information. TACACS+ server 202 uses LDAP 203 to authenticate users attempting to access the managed network device 201. LDAP 203 maintains a database of user accounts, which includes usernames, passwords, and access rights. When the TACACS+ server 202 receives an authentication request, the server queries the LDAP 203 to verify the user's credentials. LDAP 203 is integral to the authentication process, ensuring that only valid users are granted access to network resources.

Communications network 125 serves as the backbone for data transmission between the various components in the system. This network facilitates communication between the APP 115, the managed network device 201, the TACACS+ server 202, and LDAP 203; however, some communications may occur outside of communications network 125, as indicated above. Communications network 125 can be implemented using various technologies, such as wired, wireless, or optical networks, to provide reliable and secure connectivity. The network ensures that data is transmitted efficiently and securely between components within the network, supporting the overall functionality of the system.

APP 115 plays an important role in the system, serving as the interface through which users interact with the managed network device 201. APP 115 is responsible for initiating communication with the managed network device 201 by sending authentication requests and management commands and receiving authorizations and responses. The design of the APP 115 focuses on user-friendliness, allowing seamless interaction with the network device while maintaining high security standards. APP 115 can be implemented as a software application on a user's device, such as a computer 114 or a mobile device, and is capable of interfacing with the communications network 125 to facilitate secure data exchange. APP 115 interacts with the TACACS+ server 202 via the managed network device 201 to authenticate user credentials and obtain necessary permissions for accessing network resources.

Messages 205 between the APP 115 and the managed network device 201 may not be over a secure communication link that allows the APP 115 to send commands and receive responses from the managed network device 201. The connection serves as an important pathway for executing network management tasks and is protected by authentication mechanisms to safeguard against potential security threats; however, packet sniffing of connection could result in compromise of the username and password combination, especially when a TELNET connection is used.

Messages 206 and 207 between the managed network device 201 and the TACACS+ server 202 transmit authentication and command authorization requests. Messages 206 ensures that the managed network device 201 can verify user credentials and obtain necessary permissions from the TACACS+ server 202. The connection between the managed network device 201 and the TACACS+ server 202 is an important pathway for executing network management; however, packet sniffing of this connection could also result in compromise of the username and password combination due to the weak encryption.

Messages 207 between the TACACS+ server 202 and the managed network device 201 transmit queries for authorization to execute commands requested by APP 115. Every command sent to the managed network device 201 requires submitting an authorization request to the TACACS+ server 202. In response, the TACACS+ server 202 acknowledges or rejects the command based on the TACACS policy.

Messages 208 between the TACACS+ server 202 and LDAP 203 are used for querying user information and validating credentials. The connection between the TACACS+ server 202 and LDAP 203 allows the TACACS+ server 202 to access the directory service provided by LDAP 203, ensuring that user authentication is based on accurate and up-to-date information. The connection is a secure channel that supports the integrity of the authentication process.

The TACACS+ server 202 sends message 209 to logging server 204 for the purposes of logging the command authorized to be performed by managed network device 201.

Implementing a Zero-Trust security model in existing Authentication, Authorization, and Accounting (AAA) network management protocols, such as TACACS+, presents significant challenges. The current TACACS+ protocol described above, while widely used for network device management, suffers from several vulnerabilities. The encryption mechanisms are often weak, making the protocol susceptible to replay attacks and other forms of cyber intrusion. Additionally, the use of static user profiles and the lack of dynamic authorization capabilities limit the effectiveness in a Zero-Trust environment. TACACS+ can operate in two modes. One mode is where all traffic including passwords are sent in clear text, and the only security is IP address filtering. The other mode is data obfuscation (RFC 8907 Section 4.5), where the packet header is clear-text, but the body including passwords is obfuscated with an MD5-based method. The MD5-based obfuscation method is similar to that used for the RADIUS User-Password attribute (RFC 2865 Section 5.2) and therefore has similar security properties. However, TACACS+ supports using RSA as an OTP solution but has a one-token-per-minute limitation, hence RSA is not suitable for automation.

Figure 2B:
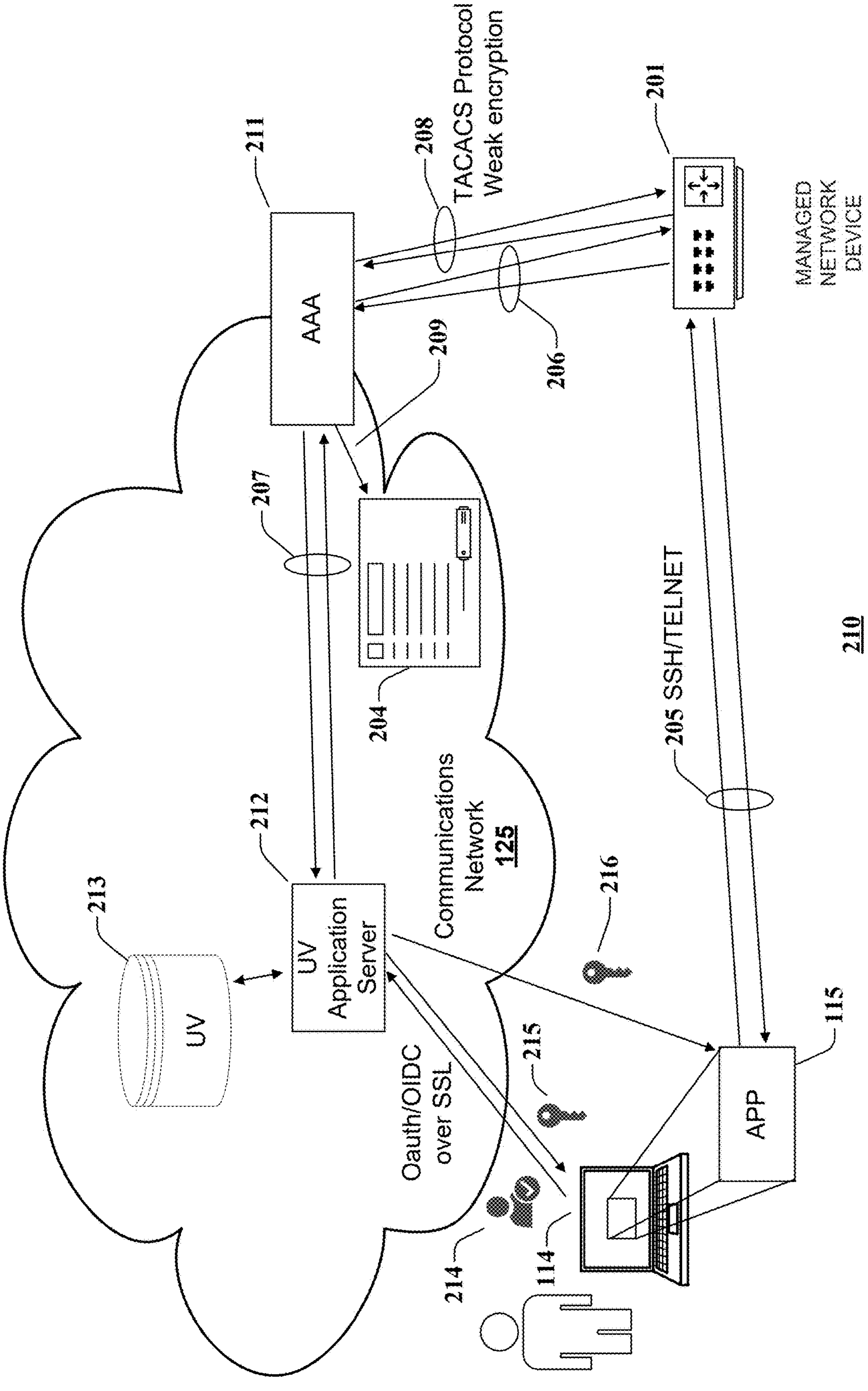
FIG. 2B is a block diagram illustrating an example, non-limiting embodiment of a system for implementing a Zero-Trust security model for an AAA protocol functioning within the communication network of FIG. 1 in accordance with various aspects described herein.

FIG. 2B is a block diagram illustrating an example, non-limiting embodiment of a system for implementing a Zero-Trust security model for an AAA protocol functioning within the communication network of FIG. 1 in accordance with various aspects described herein. System 210 leverages advanced authentication and authorization mechanisms to establish a trusted relationship between network components, ensuring secure communication and access control. By integrating robust security protocols and dynamic authorization processes, the disclosed system enhances the security and scalability of network management systems. The system facilitates seamless automation and user interaction, providing a comprehensive solution that aligns with the principles of the Zero-Trust security model. Through these innovations, the disclosed system significantly improves the security posture of network environments, protecting sensitive data and resources from unauthorized access and potential breaches.

As shown in FIG. 2B, system 210 comprises an AAA server (AAA 211), a user-vault authorization server (UV 212) and a user-vault database 213. In an embodiment, system 210 combines OAuth/OIDC protocols, secure enclaves, and a vault system to enhance security through the generation and management of temporary credentials having time-bound lifecycles, like One-Time Passwords (OTP) or Limited-Time Passwords (LTP). At the heart of system 210 is the OAuth/OIDC protocol, which facilitates secure authorization and authentication. By using OAuth/OIDC, the system ensures that users and applications can authenticate themselves without exposing sensitive username/password credentials, relying instead on secure tokens that are issued and managed by UV 212.

AAA 211 depicted in FIG. 2B is responsible for managing authentication, authorization, and accounting (AAA) services for network device management. AAA 211 acts as a centralized authority that verifies user credentials and enforces access policies, ensuring that only authorized users can access network resources. AAA 211 interacts with other components, such as UV 212 and the user-vault database 213, to retrieve user information and validate credentials, without changing the existing protocol. For example, if AAA 211 uses a TACACS+ protocol, no changes are required for the AAA 211 to operate within system 210, as set forth in more detail below. AAA 211 is considered to be in a protected group of the Zero-Trust security model.

The user-vault application server (UV 212) plays a significant role in the system, facilitating secure storage and management of user credentials and temporary authorization tokens in a protocol-specific manner. This server acts as an intermediary between AAA 211, APP 115 and the user-vault database 213, by providing protocol-compliant interfaces and ensuring that sensitive information is securely stored and accessible only to authorized users and applications. UV 212 generates and manages temporary credentials, such as OTPs or LTPs, which are used to authenticate sessions and provide dynamic access control. During an initial onboarding process, UV 212 registers a user of computer 114 and/or APP 115. In an embodiment, registration of the user may include, but is not limited to business unit, location, domain, least access privilege, or most access privilege, and whether an app is delegated to perform on behalf of the user (i.e., delegation of authorization to the APP). In an embodiment, registration of the APP may include, but is not limited to the user's business unit, an availability domain (for security and device diversity reasons, network elements (NE) are divided into several security domains), offer roles (NEs offer different levels of access capability, referred to as "roles," for example, root, readonly, configuration, service desk, read-write, etc.), and minimum access privileges. Access to this information is stored in the user-vault database 213. By default, all users are not to be considered trusted. The user and APP 115 are considered to be in a protected group of the Zero-Trust security model if they have securely authenticated over a network interface with UV 212 in the secure enclave. In an embodiment, system 210 incorporates multi-factor authentication (MFA), adding layers of security beyond just passwords to verify the identity of users and devices. Access to applications and data stored in user-vault database 213 is secured through encryption and other measures, ensuring that data remains protected during transmission and storage. Security policies are enforced dynamically, based on real-time context such as user identity, device health, and location.

User-vault database 213 serves as a secure repository for storing user credentials and temporary authorization tokens. This database is designed to protect sensitive information from unauthorized access by employing advanced encryption techniques and secure storage mechanisms. The user-vault database 213 interacts with UV 212 to provide secure access to stored credentials and facilitate the generation of temporary authorization tokens. In an embodiment, user-vault database 213 utilizes hardware-based security features to protect data stored therein. By maintaining a comprehensive record of user credentials and access policies, user-vault database 213 supports the dynamic authorization capabilities of the AAA 211, ensuring that access to network resources is granted based on real-time context and user-specific requirements. The secure management of credentials within the user-vault database 213 hosted within a secure enclave is an integral part of the Zero-Trust approach of system 210, providing a robust layer of security that protects against potential data breaches and unauthorized access.

UV 212 and user-vault database 213 play a pivotal role in securely storing and managing these temporary credentials. When a user and/or APP 115 needs to manage a network device, the user submits an authentication request to UV 212. UV 212 coordinates with the user-vault database 213 to generate temporary authorization tokens, such as an OTP or LTP, which is then used to authenticate the session. By leveraging communications network 125 as a secure enclave and using advanced encryption techniques, UV 212 ensures that these credentials are protected from unauthorized access and potential breaches. UV 212 also supports automation and user-friendliness, allowing seamless integration with automated processes and facilitating ease of use for human operators. UV 212 also detects and prevents security threats, as set forth in more detail below.

User credentials 214 are an important aspect of the system, representing the identifiers and authentication information associated with each user. These credentials are securely stored within the user-vault database 213 and provided to UV 212 to verify user identity and grant access to network resources. User credentials 214 typically include information such as, but not limited to, usernames, passwords, certificates and access rights, which are protected by advanced encryption techniques to prevent unauthorized access. The management and validation of user credentials 214 is essential to maintaining the security and integrity of the network, ensuring that only authorized users can access sensitive data and perform network management tasks. Hence, the connection between computer 114 and UV 212 must be a secure channel. System 210 has the ability to dynamically update and manage user credentials 214 in response to changing security requirements and user-specific needs based on pre-approved profiles, which is an important feature of the Zero-Trust approach.

The first authorization token 215 is a temporary credential generated by UV 212 to facilitate secure access to network resources. This token is issued to the user operating computer 114 or APP 115 upon successful authentication. Token 215 is substituted for the password in the username/password authentication message 205 when directly used from the computer. In an embodiment, the first authorization token 215 includes metadata designed ensure the token is time-limited and context-specific, ensuring that access is granted only for the duration and scope necessary to complete a particular task. By employing advanced encryption techniques and secure transmission protocols, the system ensures that the first authorization token 215 is protected from unauthorized access and potential replay attacks, since managed network device 201 receives token 215 as a password and sends it along to AAA 211 via message 206 to authenticate the user and/or APP 115 as a prerequisite for executing the task. The use of temporary authorization tokens, such as the first authorization token 215, aligns with the principles of a Zero-Trust security model, providing a dynamic and flexible approach to access control that enhances the overall security of the network. Managed network device 201 is considered to be unsecured in the Zero-Trust security model. When AAA 211 receives the username/token combination in message 206, in turn AAA 211 provides the username/token combination in message 207 to UV 212, which grants authorization an a necessary profile to AAA 211, provided the username/token is valid. If UV 212 receives the same username/token combination a second time, UV 212 can easily deny the request, thereby enforcing the one-time nature of token 215.

The second authorization token 216 is derived from the first authorization token 215 and functions similarly to the first authorization token 215, providing an additional layer of security and access control within the system. This token is also generated by UV 212 using the first authorization token 215 and is used to authorize specific actions or access requests within the network from a given user and APP pair. Once granted by UV 212, the second authorization token 216 can be used to request one or many sub-tokens from UV 212, each having a specific profile for a specific device. In an embodiment, the second authorization token 216 may be issued in scenarios where additional privileges or access rights are required, and the token defines the access privileges, allowing for an escalation process that grants temporary elevated access for specific activities. In an embodiment, the second authorization token 216 is time-limited and context-specific, ensuring that access is granted only for the necessary duration and scope. The use of multiple authorization tokens, such as the first and second authorization tokens 215 and 216, provides a robust and flexible approach to access control, supporting the system's Zero-Trust security model and enhancing the overall security posture of the network. Second authorization token 216 could also be renewed as many times as needed, or in a rotation, to secure the process further.

By integrating these technologies, the system not only enhances security but also supports dynamic and flexible access control. The use of temporary credentials ensures that each session is uniquely authenticated, reducing the risk of replay attacks and unauthorized access. This approach aligns with modern security practices, providing a robust solution for managing access in a secure and efficient manner.

Figure 2C:
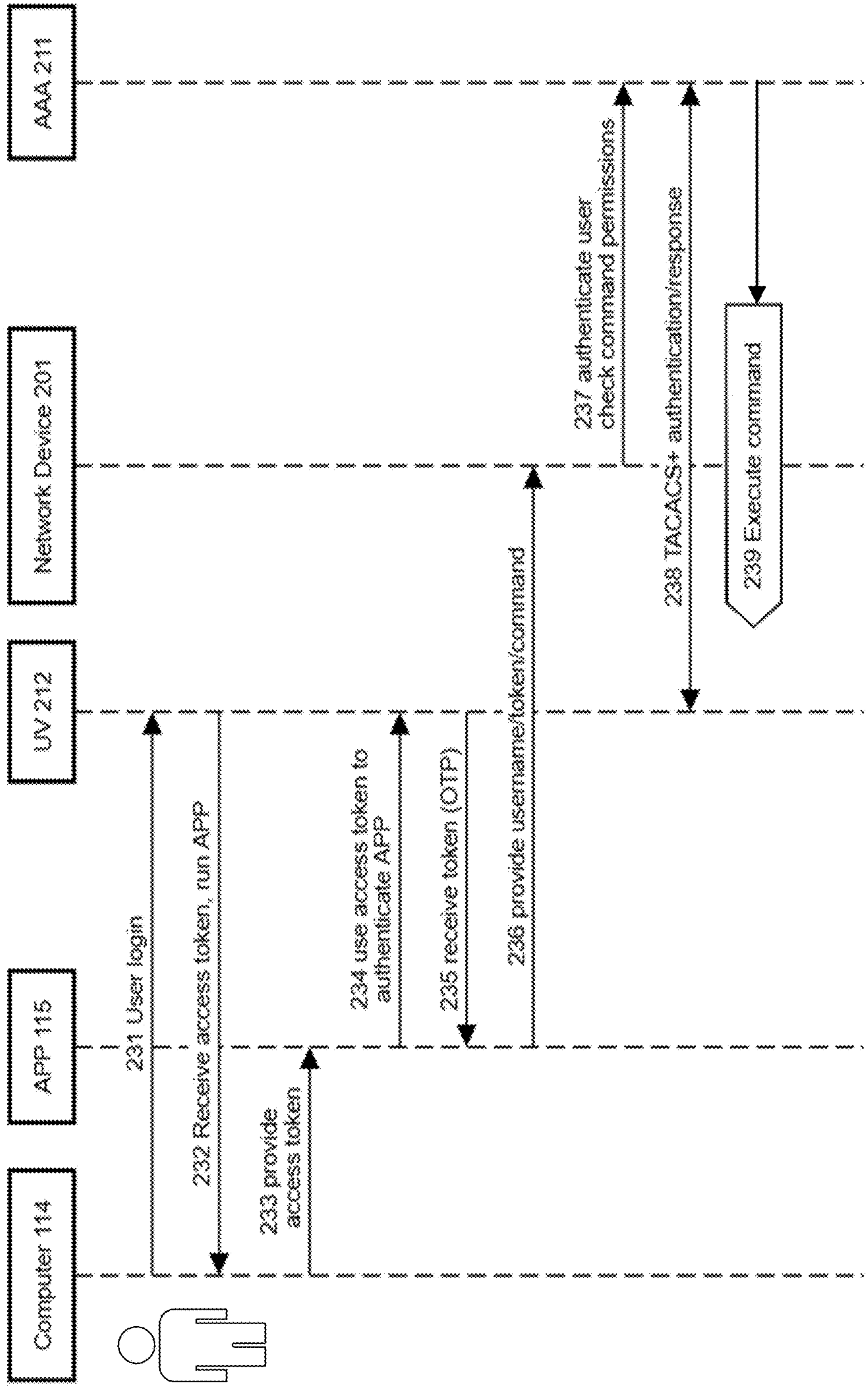
FIG. 2C depicts an illustrative embodiment of a method in accordance with various aspects described herein.

FIG. 2C depicts an illustrative embodiment of a method in accordance with various aspects described herein. As shown in FIG. 2C, method 230 begins with step 231, where a user initiates a session by logging into the system. This step involves the user providing their credentials, which are typically a username and password and can include MFA, to authenticate their identity. The login process plays a significant role as it establishes the user's identity and initiates the secure communication process. The credentials provided by the user are verified against a secure database, ensuring that only authorized users can access the system. In an embodiment, the system uses OAuth/OIDC, and the user initiates a login process to a AAA front-end embedded within UV 212. This step is foundational to the Zero-Trust security model, which operates on the principle that no user is trusted by default and requires verification before gaining access to network resources. In an embodiment, the user can request a privilege escalation to have more access privileges than a default read-only (RO) privilege. This privilege escalation is time bound and will revoke any outstanding OTP tokens.

Upon successful authentication during step 231, UV 212 generates an access token, which is received by the user's device in step 232. This access token serves as a temporary credential that allows the user to use APP 115 within the network. The token is securely stored in the user's environment and is used to authenticate APP 115, ensuring that only authorized applications can run. In an embodiment, the access token and a refresh token described below have lifetimes that are set appropriately to accommodate maintenance windows. In an embodiment, UV 212 can perform on-the-fly encryption of the access and refresh tokens to securely transfer them to the user's device. Step 232 plays a significant role in maintaining the security of the system, as it prevents unauthorized applications from accessing sensitive data. The token's temporary nature aligns with the Zero-Trust security model, providing dynamic and context-specific access control.

In the step 233, the access token generated and received in the previous step is provided to the application (APP 115) to authenticate the application's access to the network.

Next in step 234, APP 115 uses the provided access token to authenticate itself with the network. This step plays an important role in establishing a secure session between the application and the network, allowing the application to access necessary resources. The token serves as a secure credential that verifies the application's identity, ensuring that only authorized applications can interact with the network. This step is an important component of the Zero-Trust security model, which emphasizes the need for continuous verification of all entities accessing the network.

Then in step 235, APP 115 receives a refresh token, i.e., either a One-Time Password (OTP) or Limited-Time Password (LTP) from the user-vault application server (UV 212). The refresh token is a temporary credential that provides an additional layer of security, ensuring that the session is authenticated in a distinct manner. This step plays a critical role in preventing replay attacks and unauthorized access, as the refresh token is valid only for a single session. The use of OTPs/LTPs aligns with the Zero-Trust security model, providing a dynamic and flexible approach to access control that enhances the overall security of the network. The refresh token will be used to subsequently request additional tokens for every network device 201 that the application will have to access, each token has an owner profile and can vary from one network device to another.

In step 236, APP 115 sends the user's username, appid, and the access token. The managed network device 201 will use this information to grant APP 115 access to the device. Once access is granted, APP 115 can start sending the command within a session. This step plays an important role in ensuring that the command is executed only by authorized users and applications. The combination of the username, refresh token, and command serves as a secure credential that verifies the user's identity and authorizes the command. This process is an integral feature of the Zero-Trust security model, providing a robust and flexible approach to access control that enhances the security of the network.

In step 237, the managed network device 201 verifies the user's identity and the APP's identity. Once the session is granted, the AAA protocol will validate every single command within this session to validate the authorization with AAA 211. These checks of the command permissions via a message sent to the AAA protocol server (AAA 211). This step plays a significant role in ensuring that only authorized users can execute commands on the network device. The verification process involves checking the user's credentials and command permissions against a secure database, ensuring that only authorized commands are executed. This step is an important component of the Zero-Trust security model, which emphasizes the need for continuous verification of all entities accessing the network.

Next in step 238, the AAA 211 protocol server authenticates the user's credentials and the APP's credentials. UV 212 will send the profile for the session, which should be authorized with the command permissions for the session and any time limits for the session. This step plays a significant role in ensuring that only authorized users can execute commands on the network device. The TACACS+ protocol provides a reliable method for managing authentication and authorization, ensuring that only trusted users can access network resources. This process is an important feature of the Zero-Trust security model, providing a robust and flexible approach to access control that enhances the security of the network.

In step 239, AAA 211 provides the authorization policy to the managed network device 201, which in turn carries out the command provided by the user, following successful authentication and authorization. During the lifetime of the session, TACACS+ ensures that the authorization policy is met, including the time limit of an LTP. The advantage of this technique is that if the TACACS+ communication is intercepted and decoded, then TACACS+ knows if the OTP is used, and will reject the connection. Since the OTP is one time, replay attacks are prevented. Another advantage is that the solution may be used over a TELNET connection. This step represents the culmination of the authentication process, allowing the user to perform the desired action on the network device. The execution of the command depends on the successful verification of the user's credentials and command permissions, ensuring that only authorized actions are performed. This step plays an important role in the Zero-Trust security model, which emphasizes the need for continuous verification and authorization of all actions performed on the network.

While for purposes of simplicity of explanation, the respective processes are shown and described as a series of steps in FIG. 2C, it is to be understood and appreciated that the claimed subject matter is not limited by the order of the steps, as some steps may occur in different orders and/or concurrently with other steps from what is depicted and described herein. Moreover, not all illustrated steps may be required to implement the methods described herein. This process can also be enhanced by having another parallel process between APP 155 and UV 212 that will authorize every command before been sent to managed network device 201. In this case, the authorization process will be performed by UV 212 directly and AAA 211 with only proxying the managed network device 201 AAA request to UV 212. This can provide an extra layer of security as the replay of the authorization from managed network device 201 to AAA 211 will be blocked by this extra step.

Figure 3:
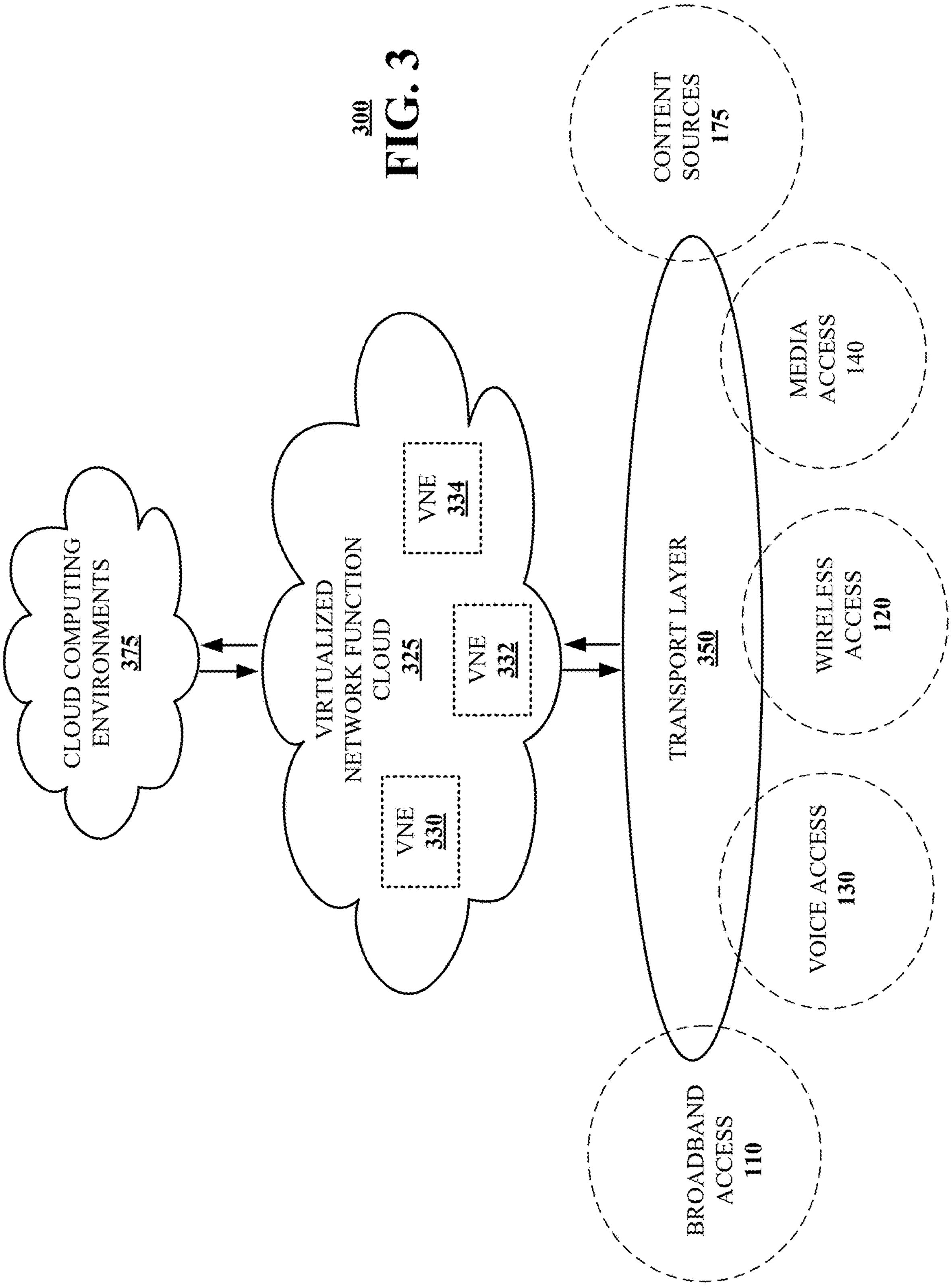
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part authenticating user equipment; dynamically generating temporary authorization tokens; and verifying the temporary authorization token against credentials stored in a vault.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. At other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
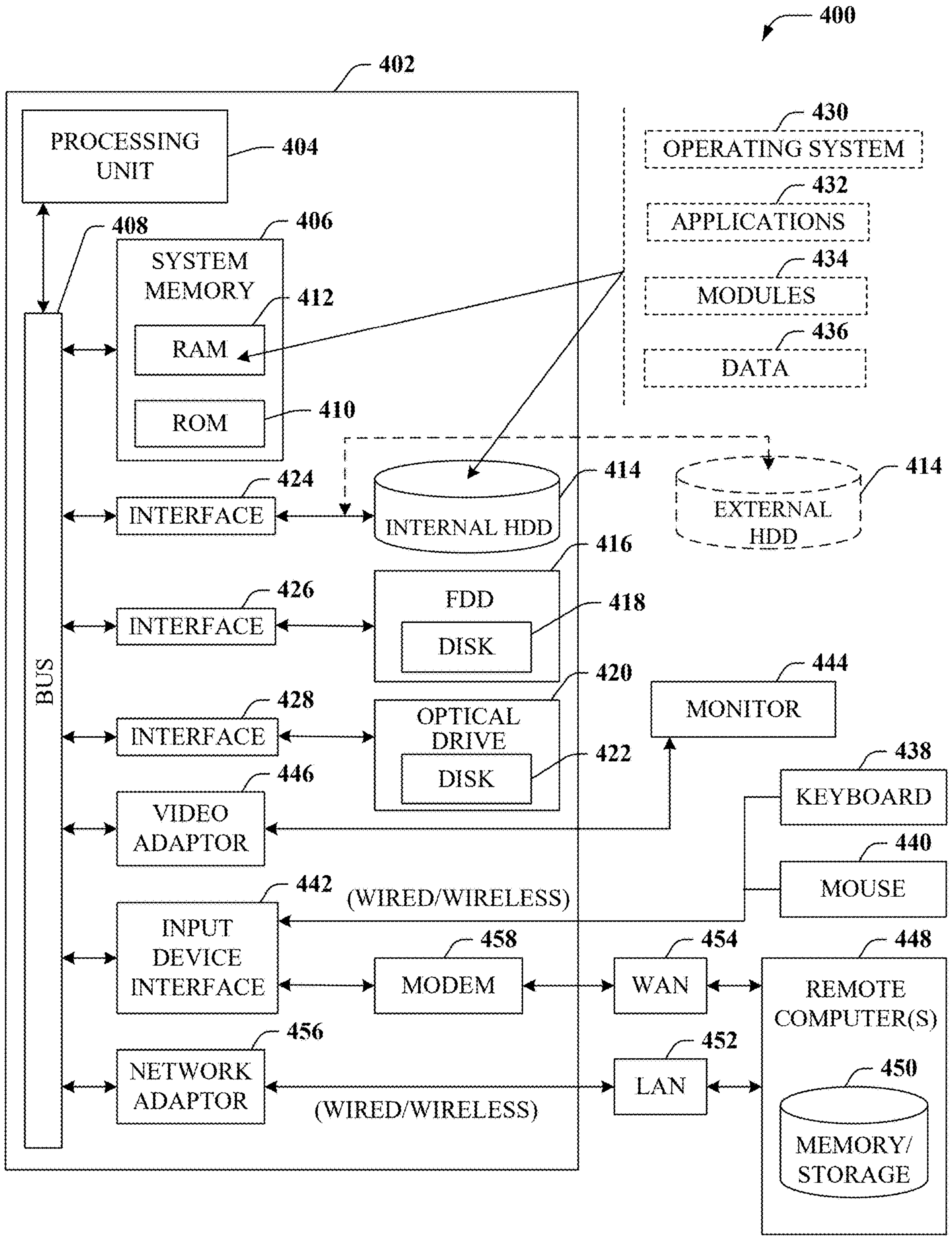
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 suitable for implementing the various embodiments of the subject disclosure. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part authenticating user equipment; dynamically generating temporary authorization tokens; and verifying the temporary authorization token against credentials stored in a vault.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, programming modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any means of communication, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof can be stored in the remote memory/storage device 450. It will be appreciated that the network connections shown are examples and other means of establishing a communications link between the computers can be used.

The computer 402 can be operable to communicate with any wireless devices or entities operatively disposed of wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure to a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
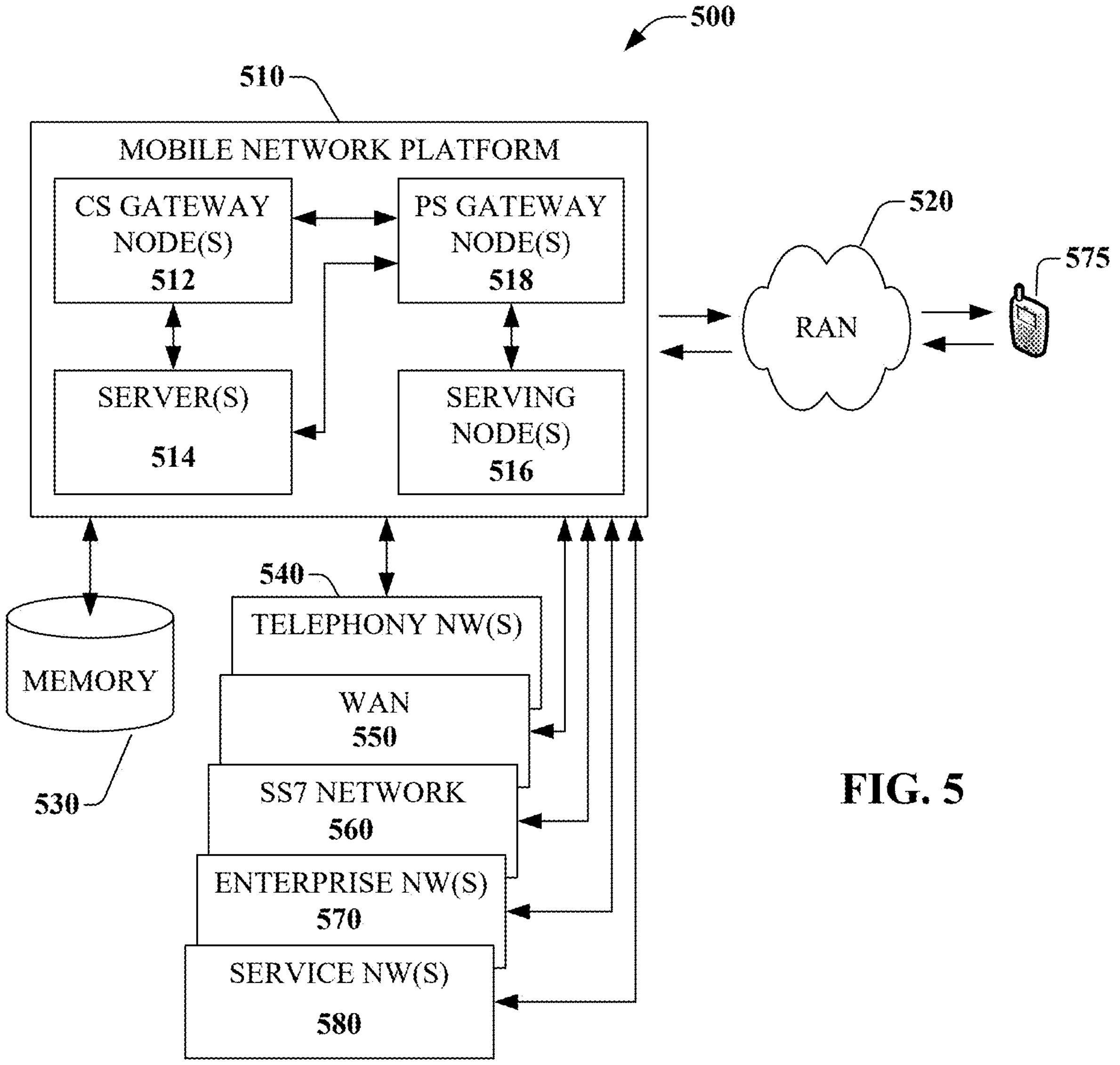
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part authenticating user equipment; dynamically generating temporary authorization tokens; and verifying the temporary authorization token against credentials stored in a vault. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated with mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
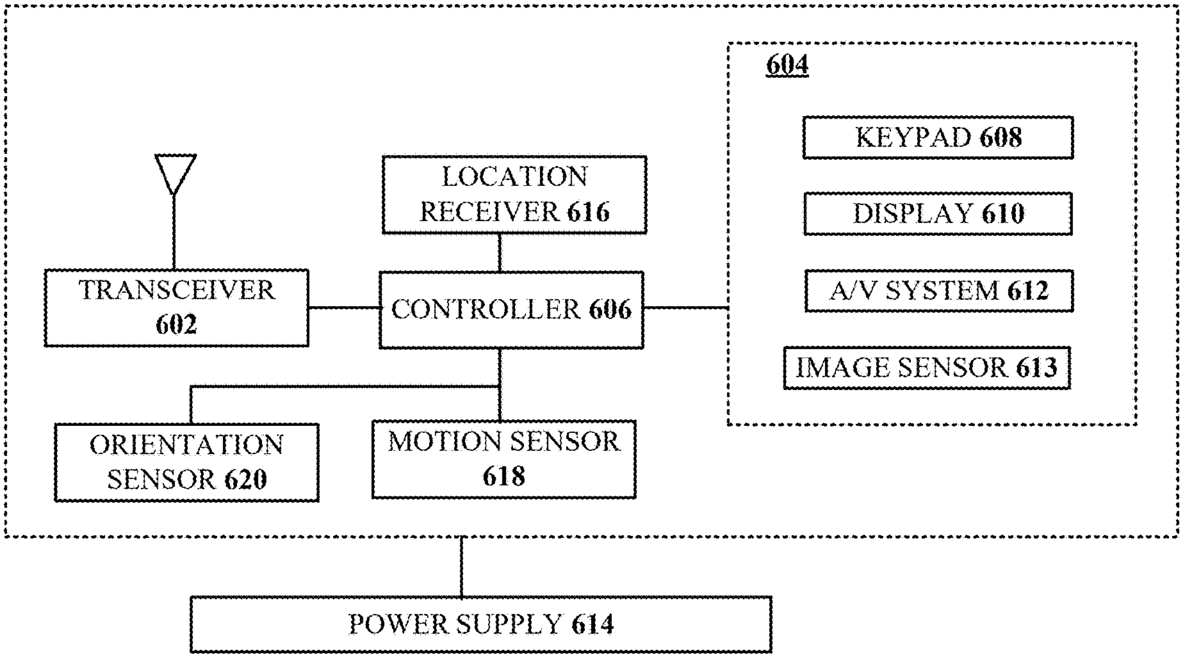
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part authenticating user equipment; dynamically generating temporary authorization tokens; and verifying the temporary authorization token against credentials stored in a vault.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying the location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or non-volatile memory, or can comprise both volatile and nonvolatile memory, by way of illustration, and not limitation, volatile memory, non-volatile memory, disk storage, and memory storage. Further, nonvolatile memory can be included in read-only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x_1, x_2, x_3, x_4 \ldots x_n)$, to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can be executed from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications that can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, the use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

authenticating user equipment over a network interface;

communicating with a vault hosted in a secure enclave to dynamically generate a temporary authorization token;

sending the temporary authorization token to the user equipment;

receiving the temporary authorization token from a network device via a TACACS+ protocol interface for authentication and command authorization; and verifying the temporary authorization token against credentials stored in the vault, thereby implementing a Zero-Trust security model for network device management in an unsecured environment.

2. The device of claim 1, wherein the temporary authorization token is based on OAuth/OIDC protocols.

3. The device of claim 1, wherein the temporary authorization token defines access privileges and has a time-bound lifecycle.

4. The device of claim 1, wherein the temporary authorization token has a one-time use lifecycle, wherein the temporary authorization token is provided to the network device from the user equipment over a TELNET connection, and wherein the operations further comprise issuing subsequent temporary authorization tokens at a rate greater than once per minute.

5. The device of claim 1, wherein the temporary authorization token is used to enforce a privilege escalation and prevent replay attacks.

6. The device of claim 1, wherein the authenticating includes elements, such as biometric data or a security token, used in multi-factor authentication.

7. The device of claim 1, wherein the vault utilizes hardware-based security features to protect sensitive data.

8. The device of claim 1, wherein the temporary authorization token includes metadata specifying a scope and a duration of access.

9. The device of claim 1, wherein the Zero-Trust security model incorporates threat detection and response mechanisms.

10. The device of claim 1, wherein the processing system comprises a plurality of processors operating in a distributed computing environment.

11. A non-transitory machine-readable medium, comprising executable instructions that, when executed by a processing system including a processor, facilitate performance of operations, the operations comprising:

authenticating user equipment over a network interface;

communicating with a secure enclave-hosted vault to dynamically generate a temporary authorization token;

sending the temporary authorization token to the user equipment;

receiving an authentication verification request from a network device via a TACACS protocol interface for authentication and command authorization, wherein the authentication verification request includes the temporary authorization token;

verifying the temporary authorization token against securely stored credentials; and providing an authentication verification response to the network device via the TACACS protocol interface, thereby implementing a Zero-Trust security model for network device management in an unsecured environment.

12. The non-transitory machine-readable medium of claim 11, wherein the temporary authorization token is based on OAuth/OIDC protocols.

13. The non-transitory machine-readable medium of claim 11, wherein the temporary authorization token defines access privileges and has a time-bound lifecycle.

14. The non-transitory machine-readable medium of claim 11, wherein the temporary authorization token has a one-time use lifecycle, wherein the temporary authorization token is provided to the network device from the user equipment over a TELNET connection, and wherein the operations further comprise issuing subsequent temporary authorization tokens at a rate greater than once per minute.

15. The non-transitory machine-readable medium of claim 11, wherein the temporary authorization token is used to enforce a privilege escalation and prevent replay attacks.

16. The non-transitory machine-readable medium of claim 11, wherein the authentication verification request includes multi-factor authentication.

17. The non-transitory machine-readable medium of claim 11, wherein the secure enclave-hosted vault utilizes hardware-based security features to protect sensitive data.

18. The non-transitory machine-readable medium of claim 11, wherein the processing system comprises a plurality of processors operating in a distributed computing environment.

19. A method, comprising:

authenticating, by a processing system including a processor, user equipment over a network interface;

coordinating, by the processing system, with a secure enclave-hosted vault to dynamically generate a temporary authorization token;

sending, by the processing system, the temporary authorization token to the user equipment;

receiving, by the processing system, an authentication verification request from a network device via a TACACS protocol interface for authentication and command authorization, wherein the authentication verification request includes the temporary authorization token;

verifying, by the processing system, the temporary authorization token against securely stored credentials; and providing, by the processing system, an authentication verification response to the network device via the TACACS protocol interface, thereby implementing a Zero-Trust security model for network device management in an unsecured environment.

20. The method of claim 19, wherein the authentication verification request includes multi-factor authentication elements.

* * * * *